Sept. 20, 1949.  E. H. HORNBARGER ET AL  2,482,484

VARIABLE VOLTAGE CONTROL FOR SHIP PROPULSION

Filed June 30, 1947

WITNESSES:
Robert C Baird
Nw. C. Groome

INVENTORS
Earl H. Hornbarger and
Walter Schaelchlin.
BY
Paul C. Friedemann
ATTORNEY Patented Sept. 20, 1949

2,482,484

UNITED STATES PATENT OFFICE 2,482,484

VARIABLE VOLTAGE CONTROL FOR SHIP PROPULSION

Earl H. Hornbarger, Edgewood, and Walter Schaelchlin, Pittsburgh, Pa., assignors to Westinghouse Electric Corporation, East Pittsburgh, Pa., a corporation of Pennsylvania Application June 30, 1947, Serial No. 758,199

4 Claims. (Cl. 318—143)

Our invention relates to a system of control for motor generator sets and more particularly to systems of control for the generator and motor combination of ship propulsion systems.

Still more particularly our invention relates to a speed control for a direct current motor coupled to a direct current generator and wherein such control is effected by regulation of the voltage of the generator supplying the direct current motor.

One broad object of our invention is the substantial elimination of violent load current surges through the motor armature during starting, during normal operation, as well as during maneuvering.

It is also a broad object of our invention to provide stable low speed operation regardless of variations of the torque load on a direct current motor.

It is still further a broad object of our invention to maintain the horsepower of a motor operating at normal speed substantially constant regardless of changes of the torque on the motor shaft.

A somewhat more specific object of our invention is the provision of a regulating exciter for the generator of a motor generator set having such changing characteristics with changes in voltage adjustment of the generator that effective speed control for the motor coupled to the generator is obtained at low speed settings.

The objects hereinbefore stated are merely illustrative. Other objects and advantages will become more readily apparent from a study of the following specification and the accompanying drawing, in which.

Our invention has general utility, but in the disclosure to follow the invention is shown and described in combination with a ship propulsion system merely because our invention has actually been applied in such combination.

Figure 1:
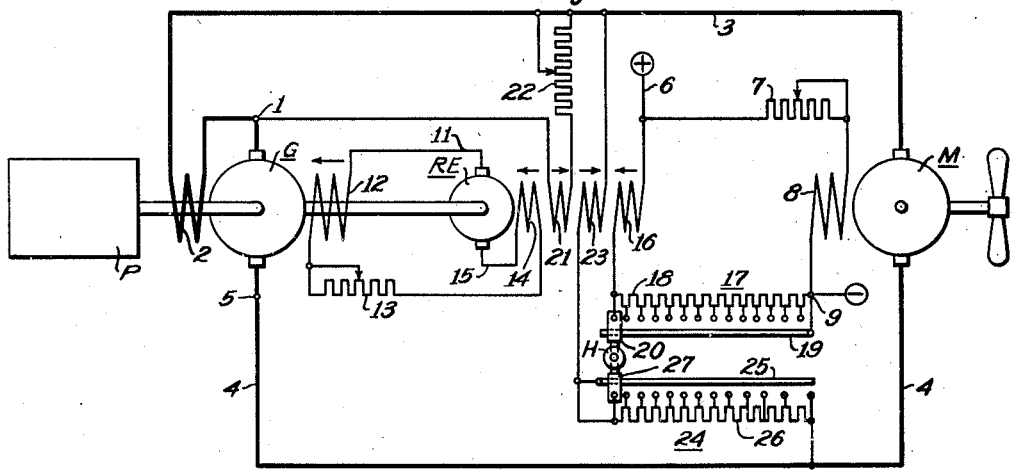
Figure 1 is a diagrammatic showing of our contribution to the art.

In Fig. 1 a suitable prime mover P, as a Diesel engine, turbine, steam engine, etc. is mechanically coupled to drive the main generator G. The control is usually such that the prime mover operates the generator at constant speed. The armature of the generator G is connected in a loop circuit with the armature of the motor M. The circuit may be traced from the positive terminal 1 through the commutating field 2, conductor 3, the armature of motor M and conductor 4 to the negative terminal 5.

The motor field is excited at a selected value from the direct current terminals 6 and 9. The circuit extends from the positive terminal 6 through the rheostat 7, motor field 8 to the negative terminal 9. In an actual ship propulsion system, involving rather large equipment, the motor field circuit is not quite as simple as here stated but since the apparatus not shown is no part of our invention, no showing nor description is necessary. For our purposes we may assume the excitation of field 8 is adjusted to be constant. The only speed control of motor M is thus obtained from the changes in voltage across terminals 1 and 5 of the generator G.

A regulating exciter RE is coupled to be driven at a constant speed by the prime mover P. This type of drive is merely shown to simplify Fig. 1. In actual practice, the regulating exciter is driven at a constant speed by some suitable constant speed electric motor. This regulating exciter is usually a relatively small machine constituting one of the machines of a small motor generator set mounted on the control panels.

The regulating generator, or exciter, RE is provided with a so-called "self-energizing" field 14, a differential current field, a differential voltage field, and a pattern field.

Figure 3:
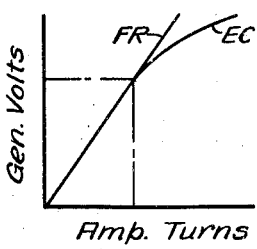
Fig. 3 illustrates some curves of value in explaining the function of the regulating exciter forming part of our invention.

The circuit for the self-energizing winding may be traced from the positive terminal 11, through the field winding 12 of the generator, adjustable resistor 13, the series field 14—often in the trade called the "self-energizing field"—to the negative terminal 15. The resistor 13 is so adjusted at the factory so that the resistance line of field 14 is tangent to the saturation curve. This is shown in more detail in Fig. 3. In this Fig. 3, the ordinates, i. e., present volts of the regulating generator or exciter RE and the abscissa represents field current. The curve FR represents the field resistance line and curve EC, represents the external characteristic of the regulating exciter RE.

The nature of the adjustment of resistor 13 makes the regulating exciter an unstable series generator. By providing the regulating exciter with a pattern field as the field 16, the output voltage thereof may be picked at any point on the external characteristic curve EC. The pattern field 16 is connected to terminals 6 and 9 by a circuit from terminal 6 through the pattern field 16, the rheostat 17 to the negative terminal 9. The rheostat 17 may be of any well known design and may be operable by a motor or manually operable as shown. For simplicity of illustration, the rheostat includes a plurality of resistor sections 18, a contact bar 19 at one end connected to terminal 9, disposed adjacent the resistor sections 18. A suitable contact 20 is disposed for slidably engaging the contact fingers of the resistor sections 1 and the contact bar 19. By moving the handle H, connected through suitable insulating members to the contact 20, back and forth the excitation of the pattern field 16 is varied.

In Fig. 1, the contact 20 is shown in the extreme left-hand position. In that position, the excitation of the pattern field 16 is a maximum and the voltage of the regulating exciter RE is a maximum. The field 12 is thus excited at top value and the motor M operates at top speed. As the contact 20 is moved to the right more and more resistor sections are placed in the circuit of the pattern field 16 to decrease the excitation of this field. Decreasing the excitation of the pattern field 16 decreases the excitation of the generator field 12 to thus decrease the motor speed. The extreme right-hand position of contact 20 thus represents the lowest motor speed point.

The discussion of the two preceding paragraphs does not take into account the need for automatic regulation of the motor operation.

In an actual ship propulsion scheme, the rheostat 17 is by no means as simple as here shown, but includes reversing control. Since the invention would be obscured by a disclosure of features not pertinent, we are confining our disclosure to the essentials.

In order to regulate for constant motor shaft torque, i. e., propeller torque, we provide the regulating exciter RE with a differential current field 21. This differential current field is, through a suitable adjustable resistor 22, connected across terminal 1 and conductor 3 and is thus excited in proportion to the motor armature current because the voltage drop across these two points is a measure of the drop across the commutating field 2. The field strength of field 21 is, therefore, proportional to the propeller torque, since motor M for the application in mind is usually of the shunt wound type, or separately excited as heretofore explained.

To provide for a regulating effect tending to provide constant speed for the motor M, we provide the regulating exciter with a differential voltage field 23. This field is connected across conductors 3 and 4 through a rheostat 24. The excitation of field 23 is thus a direct function of the voltage of the generator G.

The two differential fields 21 and 23 have like polarities and in the total ampere turns are balanced against the ampere turns of the pattern field. The regulating exciter thus supplies regulated excitation to the main propulsion generator, this may be either directly as shown in Fig. 1 or through a second exciter. The effect of the series field 14, as controlled by the balance provided by fields 21 and 23 against the pattern field 16, is to automatically regulate the excitation of field 12 to a value to maintain the balance.

The differential voltage field strength, at the normal voltage of generator G and at the normal speed of motor M, is adjusted to a weak value as compared to the field strength of the differential current field 21. In other words, at high speed settings of the rheostat 17, as for example, a setting of contact 20 nearer the left end of the resistor sections 18 or a setting of contact 20 in the extreme left-hand position, current regulation predominates a considerable extent and thus produces volt-ampere curves as shown in solid lines in Fig. 2. These curves, it will be noted, start at near the top speed at zero torque, or current, and then bend over sharply, becoming almost vertical at zero volts, namely zero speed, and maximum current. It will be noted that the maximum current for this particular system is at about 150% of full load.

At low torques, namely low load currents, these curves are almost vertical for their full length. A slight change in load current, resulting from a small change in propeller torque, allows a large change in speed so that stable operation at low speeds is impossible. A slight dropping off in torque results in a violent rise in speed, and similarly a slight rise in torque causes a rapid drop in speed. Such violent speed changes are intolerable in many applications, where low speed operation is needed and this is particularly true for dredge propulsion where low speed operation is very essential.

We, therefore, recalibrate the differential voltage field 23 so that at low speeds it becomes relatively much stronger. This recalibration we achieve by the use of the rheostat 24 which is of special construction and design and provided with special operating means that are gauged with the operating means for rheostat 17.

The lower terminal of field 23 is connected to a contact bar 25 and a plurality of resistor sections 26. The resistor sections are connected to suitable contact fingers disposed adjacent contact bar 25. The resistance value of each resistor section between each pair of contact fingers may be of the same value or may decrease in value for successive pairs of contact fingers counting from left to right.

A contact element 27 is secured to the handle H through suitable elements of insulating material. As shown, the excitation of field 23 is at a minimum when the contact element 20 is in position to provide maximum excitation for the pattern field 16. This setting is for maximum speed of operation of the motor M. The resistor sections 26 are thus all cut in the high speed position shown and as the handle H is moved to the right to the lower speed positions, more and more resistor sections are cut out until at the extreme right position all the resistor sections 26 are shunted when all the resistor sections 18 are in circuit with field 16. We thus have a system which is predominantly current regulation at high speeds and becomes predominantly voltage regulating at the low speeds. This means that as we proceed to adjust rheostat 17 for lower speeds, we obtain volt-ampere curves, counting from right to left in Fig. 2, that do not follow the full-line curves but follow the dotted line curves. It will be noted that these dotted line curves retain a definite slope that even becomes more pronounced for the lower speeds. It will also be noted that the horsepower is the same at points A and B, which points represent generator volts and amperes for normally loaded and overloaded propeller.

An interesting feature of our control, it will be noted, is that the curves represented by the dotted lines are substantially equally spaced throughout their entire length. Or, stated in somewhat more technical language which is not necessarily more accurate, the perpendicular distances between the tangents to any two dotted line curves taken remain the same. The curves appear to have equal radii of curvature with the origins of successive curves falling roughly on the bisector of the third quadrant of the coordinates shown in Fig. 2.

Figure 2:
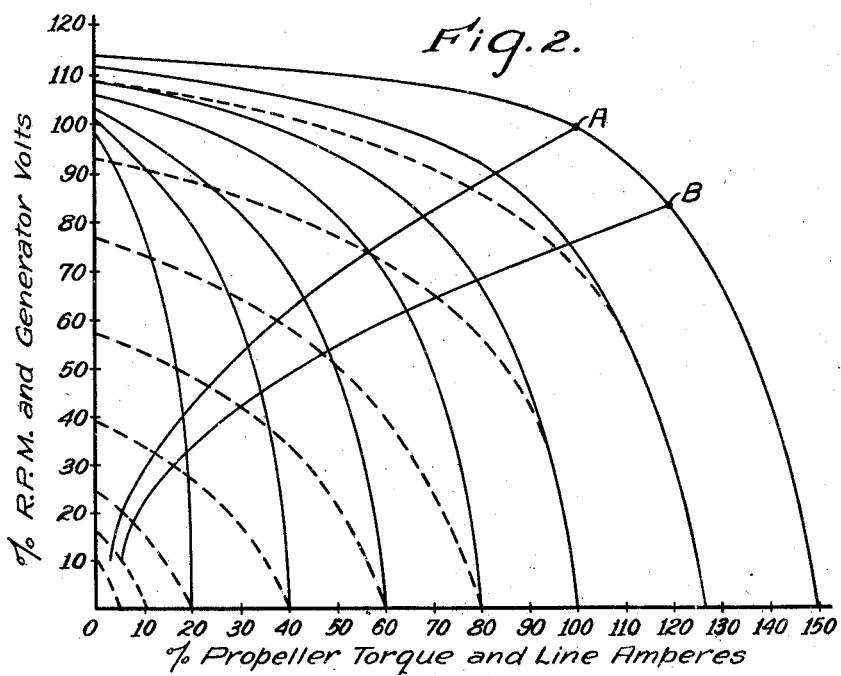
Fig. 2 shows a plurality of curves illustrating how our contribution to the art effects the novel results hereinafter pointed out in more detail.

The full-line curves on the other hand appear to emanate from some common point of origin beyond the upper left-hand corner of Fig. 2.

From the foregoing disclosure, it will be apparent that we provide a speed control for a direct current drive in combination with a regulating exciter having a current differential field to keep the current surges in the motor armature within predetermined limits, a differential voltage field and current differential field proportioned to obtain substantially constant horsepower for normal operation, irrespective of changes in motor load, and provide automatic recalibration of the differential voltage field for low speeds to insure positive speed control at low speeds of operation.

While we have shown but one embodiment of our invention, we do not wish to be limited to the showing made but wish to be limited only by the scope of the claims hereto appended.

We claim as our invention:

1. In a system of control, in combination, a regulating exciter, a generator, a generator field winding for exciting the generator, a series field for the regulating exciter, the armature winding of the regulating exciter, the generator field winding and the series field winding being connected in a loop circuit, a pattern field winding, control means for varying the excitation of the pattern field winding, a differential generator-voltage-responsive field winding for the regulating exciter, and means operable by said control means for decreasing the resistance of the circuit of said differential generator-voltage-responsive field winding at the same time the excitation of the pattern field is decreased.

2. In a system of control for a motor generator set, in combination, a motor excited at a selected value, a generator for supplying energy to the motor, a regulating exciter for the generator, excitation means for the regulating exciter responsive to the voltage of the exciter, the load current of the motor, the voltage of the generator and a variable voltage variable by the operations of a controller, and control means for relatively increasing the excitation effect of the component of the voltage of the generator with decreases of the effect of the variable voltage.

3. In a system of speed control for a direct current motor, in combination, a direct current motor having a field winding excited at a selected value, a generator for supplying energy to the motor armature terminals, said generator having a field winding, a direct current exciter having a series field winding and of the normally unstable series type connected in a loop circuit with the generator field winding, a pattern field for the exciter, means for adjusting the excitation of the pattern field over a relatively wide range, a differential field for the exciter excited in proportion to the motor load current, a second differential field excited in proportion to the generator voltage, and means for decreasing the resistance of the circuit of said second differential field as the excitation of the pattern field is decreased.

4. In a system of speed control for a direct-current motor, in combination, a direct-current motor having a field winding excited at a selected value, a generator for supplying energy to the motor armature terminals, said generator having a field winding, a regulating direct-current exciter having a series field winding, the impedance of the circuit, including the series field winding of the exciter, the generator field winding and the exciter armature, being adjusted to make the exciter of the normally unstable type, a pattern field for the exciter, means for adjusting the excitation of the pattern field over a relatively wide range, a differential field for the exciter excited in proportion to the generator voltage, and means for decreasing the resistance of the circuit of the differential field as the excitation of the pattern field is decreased.

EARL H. HORNBARGER.
WALTER SCHAELCHLIN.

REFERENCES CITED

The following references are of record in the file of this patent:

UNITED STATES PATENTS

| Number | Name | Date |
| --- | --- | --- |
| 2,300,988 | Stephensen | Nov. 3, 1942 |
| 2,431,252 | Hornbarger | Nov. 18, 1947 |